United States Patent [19]

Theus

[11] Patent Number: 5,060,139
[45] Date of Patent: Oct. 22, 1991

[54] FUTUREBUS INTERRUPT SUBSYSTEM APPARATUS

[75] Inventor: John G. Theus, Sherwood, Oreg.

[73] Assignee: Tektronix, Inc., Beaverton, Oreg.

[21] Appl. No.: 335,027

[22] Filed: Apr. 7, 1989

[51] Int. Cl.$^5$ .................. G06F 13/14; G06F 13/18; G06F 13/40

[52] U.S. Cl. .................. 364/200; 364/240; 364/240.5; 364/240.8; 364/242.6; 364/242.92; 364/242.8; 364/242.93; 364/242.5

[58] Field of Search ............... 340/825.50; 364/200 MS File, 900 Ms File

[56] References Cited

U.S. PATENT DOCUMENTS

| 4,463,445 | 7/1984 | Grimes | 364/900 |
| 4,639,861 | 1/1987 | Appiano et al. | 364/200 |
| 4,864,496 | 9/1989 | Triolo et al. | 364/200 |

FOREIGN PATENT DOCUMENTS 63-147252  6/1988  Japan.
2173929  10/1986  United Kingdom.

*Primary Examiner*—Thomas C. Lee
*Assistant Examiner*—Daniel Pan
*Attorney, Agent, or Firm*—John P. Dellett; Francis I. Gray

[57] ABSTRACT

An interface circuit board connected to a VMEbus standard backplane bus of a first data processing system, and also to a Futurebus standard backplane bus of a second data processing system, provides address/data conversion and interrupt service between the two standard bus structures. The Futurebus, being a higher level bus than the VMEbus, has no provision for hardware interrupts; event related data are conventionally transmitted across the Futurebus like any other data item. The interface board signals VMEbus interrupts to Futurebus devices by way of the Futurebus bus arbitration facility. Interrupts generated on the interface circuit board and interrupts from the VMEbus priority interrupt bus are mapped and converted into message numbers, one of which is asserted on the Futurebus arbitration bus as an arbitration number higher than the arbitration numbers assigned to Futurebus devices. Upon winning the arbitration for the Futurebus, the interface board, instead of acquiring it, releases the bus after the devices on the bus have registered the message, which thereby becomes an interrupt across the bus.

3 Claims, 4 Drawing Sheets

FUTUREBUS INTERRUPT SUBSYSTEM APPARATUS

BACKGROUND OF THE INVENTION

The invention relates to modular computer systems, and more particularly to interface apparatus facilitating communication between standard buses having different protocols.

The proliferation of microprocessors has produced the economic incentive and consequent trend to construct modular multimicroprocessor computer systems, where previous implementations used one high-performance processor. Such modular systems are facilitated by a bus structure, otherwise referred to as a backplane bus, to which the microprocessors, system controllers, data storage modules, input/output controllers and associated peripheral devices can be connected and through which they can communicate with one another. The main purpose of any bus structure is to allow devices connected to it to transfer data from one device to one or more of the other devices in accordance with a predetermined protocol of communication. A "standard" bus is one for which functional, electrical and mechanical requirements for interface circuits and a set of signal lines that constitute the bus are predetermined for all devices connected to the bus. A number of different standard bus structures have been defined and developed, and it is desirable that modules on one standard bus be able to communicate with devices on another standard bus, even though the various "standards" may differ considerably. Generally, the signal lines on standard backplane buses can be partitioned into logical groupings that include a data transfer bus, which includes address and data lines; an arbitration bus, which includes control acquisition lines; and a utility bus, which includes power leads and, on some buses, clock signals, initialization and failure detection lines.

The VMEbus, a standard 16/32 bit backplane bus, in addition to the aforementioned signal line groupings, defines a priority interrupt function, wherein a device on the VMEbus can request service from an interrupt handler by way of a priority interrupt bus to thereby invoke a software or firmware interrupt service routine. See "VMEbus Specification Manual" Revision C.1 (IEEE P1014/D1.2), Oct. 1985.

The Futurebus (ANSI/IEEE 896.1-1987) is a high-level standard bus in which no interrupt-handling facility is defined, but wherein event-driven data can be transmitted across the bus as messages having address and data items, just as all other types of data. Therefore, in an interface between VMEbus and Futurebus systems, an inordinate burden in the form of additional hardware is required to create the facility in the Futurebus system to recognize and service even simple interrupts, e.g. from single (interrupt) handler systems, which emanate from the VMEbus system or the interface hardware.

It is, therefore, a principle object of the invention to provide an improved interface circuit between standard bus structures in a multidevice modular data processing system.

A more specific object of the invention is to provide an improved means for signaling the occurrence of external events to devices connected to a standard bus structure having no interrupt facility.

Another object of the invention is to provide improved means for transmitting interrupt data across a Futurebus.

Still another object of the invention is to provide improved apparatus utilizing control acquisition logic in a Futurebus system to transmit interrupt data from a VMEbus to devices on the Futurebus.

SUMMARY OF THE INVENTION

The present invention provides a modular data processing system having a plurality of devices connected to a standard backplane bus having no hardware interrupt facility, and a bus arbitration controller which includes distributed logic arbitration circuits in each device performing an asynchronous arbitration protocol for devices contending for bus access, awarding bus mastership to the device having priority in accordance with a predetermined priority of arbitration numbers assigned to each of the devices. An event driven signal generated in one of the devices on the bus is converted to an interrupt message number having a higher priority than all arbitration numbers assigned to devices, and the interrupt message number is asserted as an arbitration number to the bus arbitration controller. Upon winning the arbitration for the bus, the device that asserted the interrupt message, instead of acquiring it, releases the bus after the devices on the bus have registered the message, which thereby becomes an interrupt across the bus.

While the invention is set forth with particularity in the appended claims, other objects, features, the organization and method of operation of the invention will become more apparent, and the invention will best be understood by referring to the following detailed description in conjunction with the accompanying drawing in which:

DRAWINGS

DESCRIPTION OF THE PREFERRED EMBODIMENT

Figure 1:
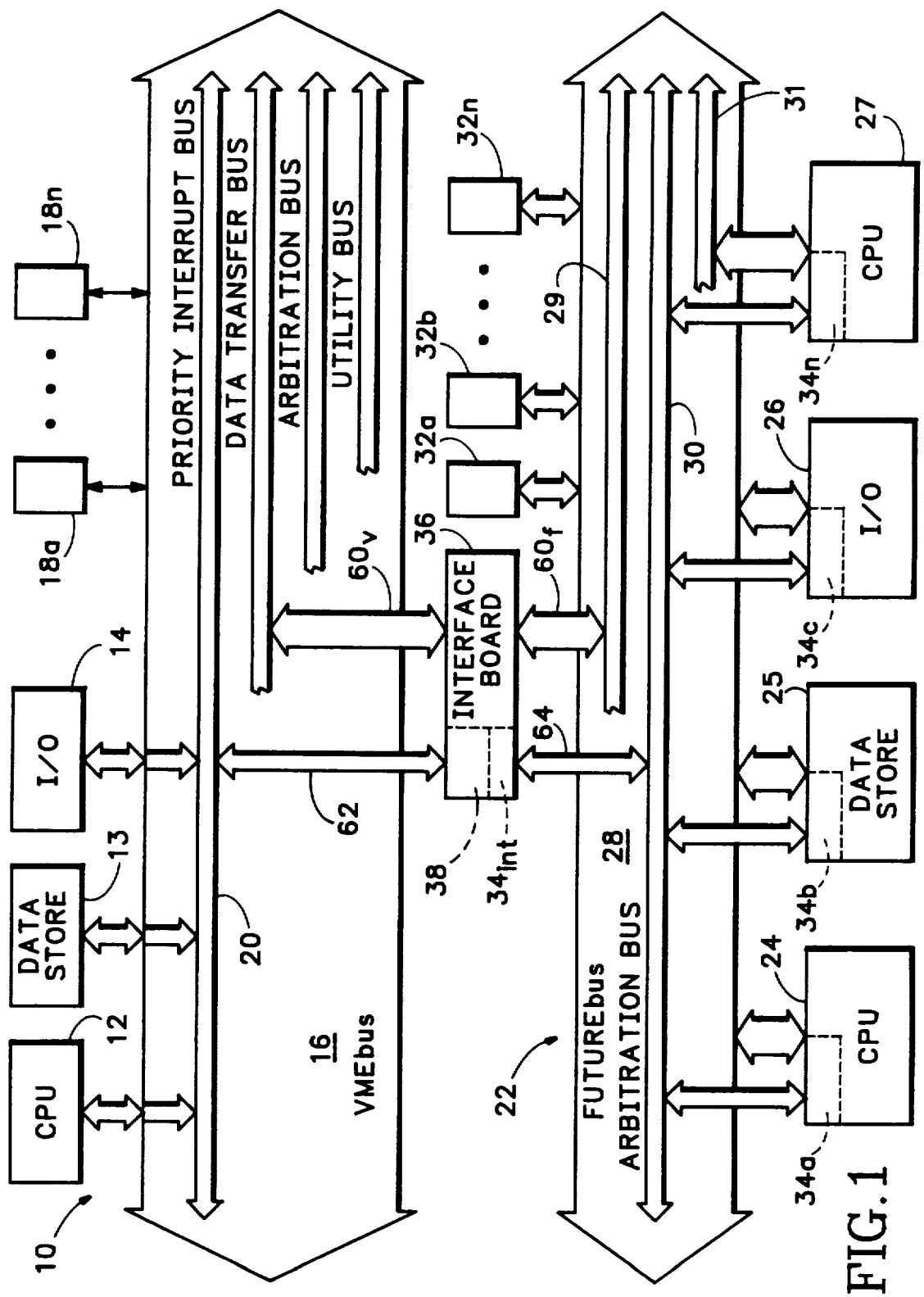
FIG. 1 is a block diagram of a modular computer system having multiple, standard bus structures.

Referring now to the drawings for a more detailed description of the construction, operation and other features of the invention by characters of reference, FIG. 1 shows a first modular data processing system 10 having a central processing unit (CPU) 12, a data store module 13, and an input/output controller 14, all connected to a standard backplane bus 16, which in the presently described embodiment of the invention is a bus described in VMEbus Specification Manual, Revision C.1 (IEEE P1014/D1.2), and referred to herein as a VMEbus. A plurality of other devices 18a . . . n, which may be, for example, other CPUs, data stores, etc. can be connected to the bus 16. The purpose of the bus 16 is to allow communication between the various devices 12-14, 18a . . . n on the bus 16 without disturbing the internal activities of the other devices connected to it, in accordance with a protocol well known in the art. The devices 12-14 on the bus 16 are connected to a priority interrupt bus 20, which is one of four functional buses provided in the backplane signal lines of the VMEbus 16. The priority interrupt bus 20, allows interrupters, functional circuit modules in the devices 12-14, to send interrupt requests to interrupt handlers, which are other functional circuit modules in the devices that respond to those requests by asking for status/ID data from the requesting module. The first data processing system 10, having such facility for hardware interrupts, includes software routines called interrupt service routines that are invoked by the interrupts in a manner well known in the art.

A second modular data processing system 22 includes a CPU 24, a data store module 25, an input/output controller 26, and a second CPU 27, all connected to a standard backplane bus 28, which in the presently described embodiment of the invention is a bus described in the Institute of Electrical and Electronic Engineers ANSI/IEEE Standard 896.1-1987, and referred to as Futurebus. As with the VMEbus 16, a plurality of other devices, not shown, such as other CPUs, data stores, etc. can be connected to the Futurebus 28.

The backplane signal lines of the Futurebus 28 comprise a number of functional buses including an address/data bus 29, a control acquisition or arbitration bus 30, and a utility bus 31, which includes power leads and geographical address lines that identify each of the physical slots on the backplane into which modules are connected. It is noted that no interrupt-handling facility is defined in the aforementioned Futurebus specification; therefore, the Futurebus 28 has no corresponding structure like the priority interrupt bus 20 on the VMEbus 16. In the Futurebus 28, event-driven data can be transmitted across the bus as messages having address and data items, just as all other types of data.

Each of the modular devices 24-27 on the Futurebus 28 is connected to the arbitration bus 30. The purpose of standard backplane buses such as the VMEbus 16 and Futurebus 28 is to share global resources with multiple CPUs and other modular devices on the bus. The most fundamental of these global resources is the address/data bus 29 of the Futurebus 28 or the data transfer bus of the VMEbus, by way of which all other global resources are accessed. In the Futurebus 28, the arbitration bus 30 controls and grants to devices on the backplane bus 28 access to the address/data bus 29 in accordance with a protocol defined in the Futurebus specification. Typically, control of the address/data bus 29 will be granted to any device that requests the bus to establish a communication path between itself and another device connected to the bus. Any one of the devices 24-27 can gain control of the bus 28, and the device granted such control is called a master, while those devices with which the bus master communicates, are termed slaves. A plurality of other devices 32a, b, . . . n that can function only as slaves are also connected to the bus 28. Devices connected to the bus 28 are thus divided into two categories, viz.: potential masters (PMs), devices 24-27 which must gain control of the bus 28 to initiate data transfers, and the remaining devices 32a-n, which can act only as slaves. The potential master devices 24-27 are further divided into two classes: (1) priority devices which require frequent or urgent access to the bus, for example, to process real-time operations; and (2) fairness devices which require less urgent access to the bus 28.

Two or more potential-master devices can attempt to gain control of the bus 28 at the same time, i.e., contention can occur; therefore, there must be means for deciding which device will be granted access the bus 28. The process of making the decision is termed arbitration, and the process is performed by a bus arbitration unit 34, which is not a centralized unit, but is distributed among the devices connected to the bus 28. Each of the devices 24-27 includes, respectively, bus arbitration circuits 34a, b . . . n, which collectively form the bus arbitration unit 34 of the Futurebus 28. Each of the bus arbitration circuits 34a, b, . . . n receives bus access control signals from the associated device including a unique geographical address or priority number, and inputs from control lines of the arbitration bus 30 indicating activity of other devices connected to the bus including their priority numbers and bus access request signals. The bus arbitration circuits 34 resolve the bus request contention and normally assign the address/data bus 29 to a specific device, permitting that device to become the bus master. Data exchange transactions are established between the bus master and a slave device in a step-by-step manner, utilizing an asynchronous, handshaking process. The master (or slave) device is not permitted to continue dialog with another device until a reply has been received from the slave (or master) device, the timing of each reply being determined by the response characteristics of the devices involved and not by a system clock. Such an asynchronous communication mode allows a system to be technology independent. The VMEbus 16 includes similar bus arbitration circuits as the Futurebus 28; however, the bus arbitration circuits of the VMEbus form no part of the instant invention.

An interface circuit 36 provides a means for the devices on the respective standard buses 16, 28 to communicate with one another. Event-driven signals or hardware interrupts from the priority interrupt bus 20 of the VMEbus 16 are transmitted to the Futurebus by way of interrupt subsystem circuits 38 of the interface board, which include bus arbitration logic $34_{int}$.

Arbitration Control

Figure 2:
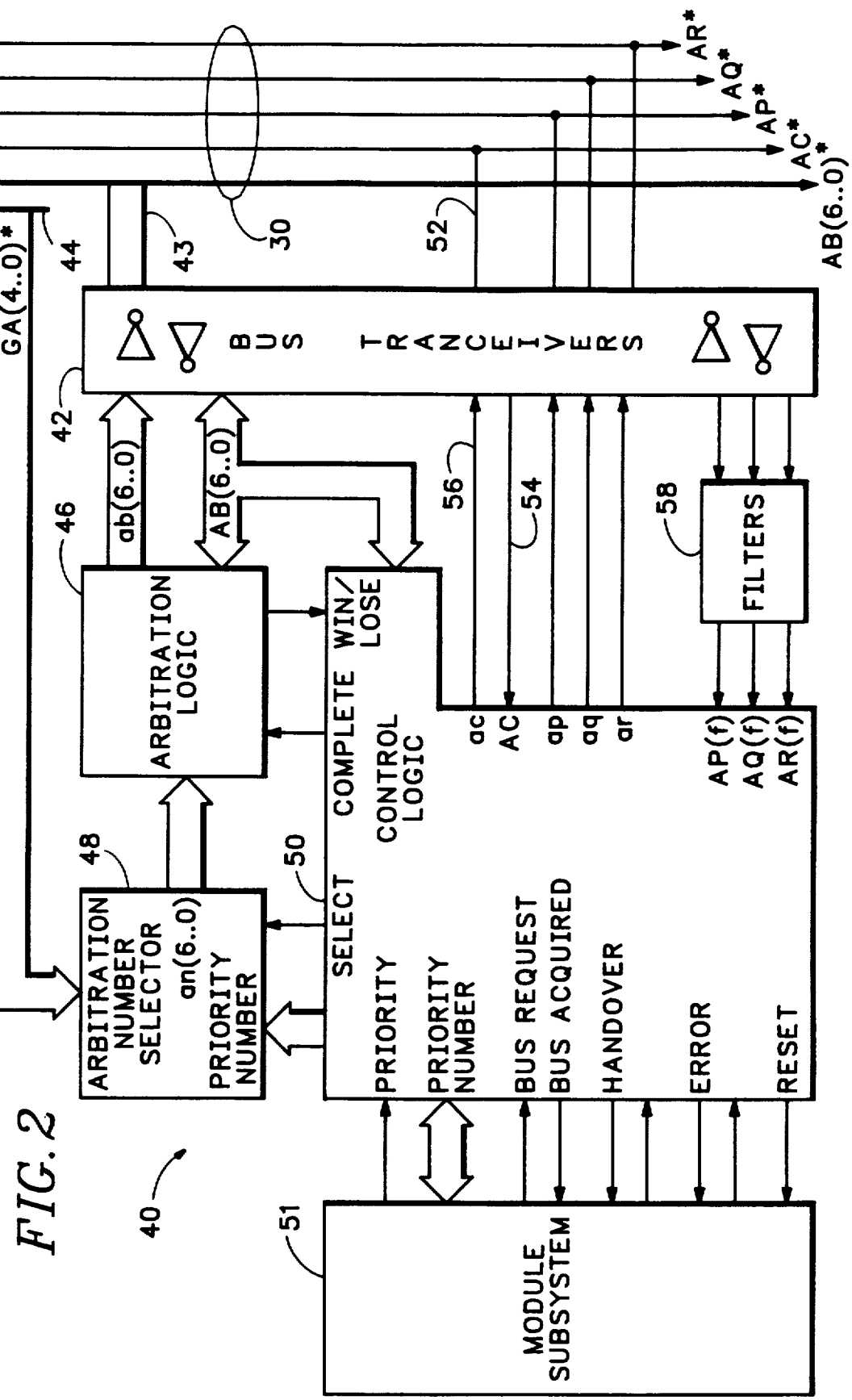
FIG. 2 is a block diagram of a Futurebus arbitration circuit.

Referring to FIG. 2 in conjunction with FIG. 1 a typical arbitration circuit 40 such as the bus arbitration circuits 34a . . . n of FIG. 1 is illustrated. Each device that is connected to the Futurebus 30 and is a PM includes such an arbitration circuit such as the circuit 40 of FIG. 2, except for differences in the bus arbitration logic $34_{int}$ of the interrupt subsystem, which are discussed later. The bus arbitration circuits 34a . . . n each compete with the others to determine which device will acquire access to the Futurebus 28 as a bus master. The following discussion of the arbitration circuit 40 applies generally to the bus arbitration circuit 34a . . . n in each device connected to the arbitration bus 30; however, to differentiate between the particular device illustrated, and other devices having similar bus arbitration logic, the illustrated device is referred to as the "instant" device. All PM devices participate in every arbitration operation, even though a particular device may not require access to the bus 28. The arbitration process is asynchronous wherein each PM device participates in a state machine that is distributed throughout all the PM devices on the arbitration bus 30. The distributed configuration ensures that each transition from state-to-state is agreed upon by all PM devices.

The arbitration bus 30 interface signal leads utilize negative logic, i.e., a less-positive level on the signal lead of the bus 30 represents a logic 1, so the voltage level of each such lead represents the OR function of the signals applied to it by the various PM devices connected to the bus. In accordance with standard practice, the logic-signal names of the bus leads are designated with an asterisk (*) to indicate that binary 1 is represented by the less-positive level.

Each of a plurality of interface signal leads AB<6..0>*, AC*, AP*, AQ*, AR* of the arbitration bus 30 is connected to each PM device across the bus 30 through bus transceivers 42 in the well-known open-collector output arrangement, wherein each lead carries a signal representing the OR function of the signals applied to the lead by the various PM devices. The AB<6..0>* signal leads represent an arbitration number. Each competing device on the bus 30 conventionally asserts an internally generated, predetermined arbitration number an<6..0>, which is applied by way of lines 43 through the bus transceivers 42 as signals ab<6..0>* to the AB<6..0>* signal leads of the arbitration bus 30. When the arbitration cycle ends, the highest priority arbitration number remains on the AB<6..0>* leads. The an6 signal, which indicates if a device is in the priority or fairness class, is enabled by priority-class devices in response to a PRIORITY signal asserted by the device, and disabled by fairness-class devices. In fairness modules, the an<5..1> signals are derived from the geographical address pin signals GA<4..0>* on a bus connector 44 for the instant device, while in priority modules the an<5..1> signals can be similarly derived from the GA<4..0>* signals or generated internally in the arbitration circuit 40. The an0 signal is a parity bit.

The arbitration circuit 40 comprises arbitration logic 46, an arbitration number selector 48 and control logic 50 connected to a module subsystem 51. In the presently described embodiment of the invention, the generic module subsystem 51 illustrated in FIG. 2 comprises the VMEbus 16, which services the data processing system 10. The arbitration number selector 48 receives the signal set GA<4..0> representing the physical location of the instant module on the bus 28, which is therefore unique to the particular device in which the arbitration circuit 40 resides. The arbitration number determines a device's priority within the arbitration class. The PRIORITY signal designates the device as a priority class device, and when asserted, enables the priority arbitration mode in the arbitration logic 46.

The AC* (arbitration condition) signal line 52 of the arbitration bus 30 is asserted by a device to signal other devices on the bus 30 that bus access is needed by the device. The AC* signal is regenerated in the bus transceivers 42 as an AC signal applied via line 54 to the control logic 50. Devices requiring Futurebus 28 access generate, in the control logic 50, a signal, ac, on line 56, which is applied to the driver of the bus transceivers 42 corresponding with the AC* signal line 52. The AC* signal line 52 serves a dual purpose: during arbitration the line serves as a general condition or status line, indicating the existence of an error condition if enabled; when no arbitration procedure is in progress, the AC* signal line is used for signaling a request for bus access.

The AP*, AQ*, and AR* interface leads of the bus 30 are coupled by way of filters 58 to the control acquisition logic 50, respectively, as signals AP(f), AQ(f), and AR(f). The AP*, AQ*, and AR* signals are used to define a distributed state machine among the devices on the bus 30 participating in arbitration, and indicate a state in a series of operations, described below, which is currently valid, thereby performing a handshaking among the asynchronous devices and maintaining synchronization of the devices during the arbitration process. Corresponding device signals ap, aq and ar are asserted by the control logic 50 and coupled by way of the bus transceivers 42, respectively, to the AP*, AQ*, and AR* interface lines.

The filters 58 solve a problem that occurs in wired-OR lines. If two or more devices are holding a bus line at binary 1, and one of the lines switches to binary 0, the redistribution of current in the line can cause a spurious pulse to appear on the line. This pulse, popularly known as a wired-OR glitch, can cause devices to misinterpret the state of the line as representing 0, although other devices are still applying 1. The effect of wired-OR glitches is overcome by including, in each line, an integrator and threshold circuit designed so that the longest possible glitch or series of glitches will not cause the output to switch erroneously.

The bus arbitration circuit 40 comprises a plurality of RS bistable logic elements connected to perform an arbitration cycle, which is a process or protocol of arbitration and control acquisition of a device connected to the Futurebus, which device is shared and in contention with other devices on the bus having a similar circuit. A control acquisition cycle is synchronized among the devices through a set of operations numbered 1–6, which are carried out sequentially, starting at operation 1 and ending either at operation 3 or operation 6, depending on the nature of the cycle. For the purpose of the ensuing discussion, a lower case signal name denotes a signal sent by the device to the bus transceivers 42 and onto the bus 30; an upper case signal name denotes the signal as received by the device from the bus transceivers 42, and reflects what actually occurs due to the wired-OR configuration of the bus 30. This convention eliminates the confusion attendant to the change of signal names that occurs, for example, at the bus transceivers 42, where the AB*<6..0>* signals input to the arbitration logic 46 become the AB<6..0> signals and the ab<6..0> output signals from the arbitration logic 46 become the AB<6..0>* signals on the arbitration bus 30. The wired-OR configuration of the arbitration bus 30 allows the competing devices to determine which of them has the highest arbitration number.

Before an arbitration cycle starts, the module having control of the bus 30, the current master, will be applying its arbitration number an<6..0>, respectively, to the arbitration bus 30 lines AB<6..0>*. All devices are in operation 1.

Any PM device connected to the bus 30 may initiate an arbitration cycle to access the bus or to acquire release from the fairness restriction, and the interrupt subsystem 38 of the interface board 36 can initiate an arbitration cycle to transmit an interrupt message across the bus 30. Prior to beginning an arbitration cycle, a PM device having a requirement for bus arbitration enables its ac signal on the lead 56 in response to a BUS REQUEST signal from the module subsystem 51; however, if the device is inhibited by the fairness restriction, the ac signal is inhibited.

Control Synchronization

The process which synchronizes the operation of the asynchronous devices connected to the bus 30 is performed collectively by the arbitration circuits 50 in each of the devices across the bus 30. Each device participating in the handshaking operation controls its own variable signals ap, aq, and ar.

The signals on the AP*, AQ* and AR* bus lines are used to form a distributed state machine among the devices participating in arbitration.

Operation 1

Initially, the ap, aq, and ar signals in every device (and therefore the AP*, AQ* and AR* bus lines) are set to the values 0, 0, 1 respectively, which indicates that the modules are in operation 1.

The cycle starts when a device that requires control of the bus, including fairness modules which are inhibited from taking part in the arbitration process itself, asserts its ap signal, which signals to all other modules that a control acquisition cycle is starting. The other modules on the bus, sensing AP+, assert their own ap signal. All modules participating in the control acquisition cycle can, at this time, register the arbitration number of the current master. Any module that is competing for the bus and is not fairness inhibited asserts the ac signal to indicate to other modules (during operation 2) that the current sequence of operations is an arbitration cycle and not a fairness release cycle. Competitors may also register that there is no current master, e.g. at system start-up, reset, etc., by sensing that all the AB<6..0>* signals are released. Modules that do not need to arbitrate for the bus, modules inhibited by the fairness protocol and the current master do not assert their ac signals. If there are no modules requesting the bus, the AC* line will be released, indicating to the modules (during operation 2) that the current sequence of operations is for fairness release rather than an arbitration cycle.

When each device completes operation 1, the respective ar signal is released; when the slowest device has disabled its ar signal, the AR* bus line is released, and all devices respond by enabling the aq signal to start operation 2.

Operation 2

All devices evaluate the AC* line. If the AC* line is released, all devices register that a fairness release procedure has been initiated and that the process shall terminate at the end of operation 3. All devices that are fairness inhibited release their inhibition; such devices can then initiate bus requests after operation 3 is completed.

If the AC* line is asserted, all devices register that arbitration is occurring, and that the process shall terminate at the end of operation 6.

The control logic 50 asserts the COMPETE signal, whereupon the arbitration logic 46 of the current master, if not competing for the bus, removes its arbitration number from the AB<6..0>* lines, while all competing modules apply their respective arbitration numbers an<6..0> to the ab<6..0> lines. After asserting the COMPETE signal, the control logic 50 waits a predetermined time for the arbitration logic 46 to settle. During this time, which may continue through operation 4, if any digit an<n> has a value 0 while the digit AB<n>* on the corresponding bus line is 1, then all the digits of lower significance, an<n-1> to an0, are disabled by the respective arbitration logic 46. After the time delay, the device winning the competition will still be asserting its ab<6..0> lines, and losing devices will have disabled one or more of their ab<6..0> lines.

As each device completes the second operation, its ap signal is released, and when the slowest device releases, the AP* bus line changes state. All devices respond to the AP* signal changing state by asserting the ar signal to start operation 3.

Operation 3

No new action is initiated during this operation. Each module notes that the next operation will be either operation 1 or operation 4, depending upon which cycle is being performed: fairness release or arbitration. In the latter case, settling of the arbitration logic continues during operation 3. The fairness procedure concludes with this operation. As each device completes operation 3, the respective aq signal is released, and when all modules have detected AQ* released, indicating that all have completed operation 3, the synchronization lines AP*, AQ* and AR* will have returned to the quiescent value (0,0,1). At this time, responsive to the actions carried out in each of the previous three operations, the modules enter either operation 1 to start a new control acquisition cycle, or operation 4. In the latter case, the sequence of synchronization signals is identical to those of operations 1-3, operations 4, 5 and 6 corresponding, respectively, to operations 1, 2 and 3. At the end of operation 6, the modules always return to the quiescent state.

Operation 4

Each device that initiated timing of the arbitration logic 46 in operation 2 completes the arbitration delay interval before terminating operation 4 to allow the arbitration number bus lines AB<6..0>* to settle. When the process settles, with the instant device as the arbitration winner, the arbitration logic 46 asserts the WIN/LOSE signal, which is coupled to the control logic 50, indicating that the arbitration number of the instant device is asserted on the AB<6..0>* lines of the arbitration bus 30. The arbitration logic 46 incorporates combinatorial logic circuits, i.e., having no feedback paths, so that the number on the arbitration lines ab<6..0> depends only on the signals currently being applied, not on any previous events, to determine which device has the highest arbitration number.

Modules not competing for the bus may exit operation 4 immediately; however, prior to the start of operation 5, if a device has error detection logic, the device performs error checks, and any device detecting an error asserts its ac signal. Devices not detecting an error and devices without error detection logic release the ac signal.

Operation 5

When there is no current master (determined in operation 2), all devices participating in arbitration initiate operation 5. If a current-master device exists, then that device initiates operation 5 when it is ready to release the bus to another master device.

Competing modules detect whether they have won or lost the arbitration at the beginning of this operation; a module having an arbitration number the same as the number on the AB<6..0>* bus lines has won and becomes the master-elect device.

Devices can store the identity of the next bus master or record an interrupt message by storing the contents of the AB<6..0>* lines.

All modules perform validation checks on the arbitration during operation 5. Participating modules check that the arbitration line signals have odd parity, even parity signifying a fault. Competing modules other than the master-elect and the interrupt subsystem 38 check that the number on the arbitration lines is greater than their own arbitration number; if not,, a fault has occurred.

If a fault is detected by a module or the module does not need to use the bus, as when it is sending an emergency message or an interrupt message from the interrupt subsystem 38 of the interface board 36, it asserts ac, signaling all modules to complete the operation; otherwise, the module waits for the master to finish its bus tenure. In some cases, however, there will be no master, for example, on initialization, and the competitors will have noted that the arbitration lines were all released in the preceding operation 1; should this be so, the master-elect initiates the end of operation 5.

An urgent need to control the bus may arise in a module that did not participate in the arbitration and is waiting for the master to finish, as, for example, when the interrupt subsystem needs to send an interrupt message across the Futurebus. A priority device with an arbitration number (which may be an interrupt message) higher than the value on the AB<6..0> lines can enable its ac signal to force a re-arbitration cycle, displacing the master-elect. This has the effect of canceling the previous arbitration, as though there had been a fault. The highest numbered competitor will win the next arbitration and become master-elect, or if the interrupt subsystem 38, transmit the interrupt message across the bus.

Operation 6

All devices evaluate the AC* bus line. If the AC* line is released, the cycle completes with normal handover of bus mastership; all devices, in response to a HANDOVER signal from the control logic 50 cancel any interlocks left by a parallel protocol, and mastership of the bus transfers from the current master to the PM device having the arbitration number which appeared on the AB<6.0>* lines during operation 5. One example of such an interlock is one imposed by a first CPU on a second CPU when both are performing read-modify-write operations on a common data store segment. Devices losing the arbitration competition remove their arbitration number from the AB<6.0>* lines.

If the AC* line is asserted, the cycle is aborted and the current master reapplies its arbitration number on the AB<6..0>* lines while all other devices remove their arbitration numbers.

Figure 3:
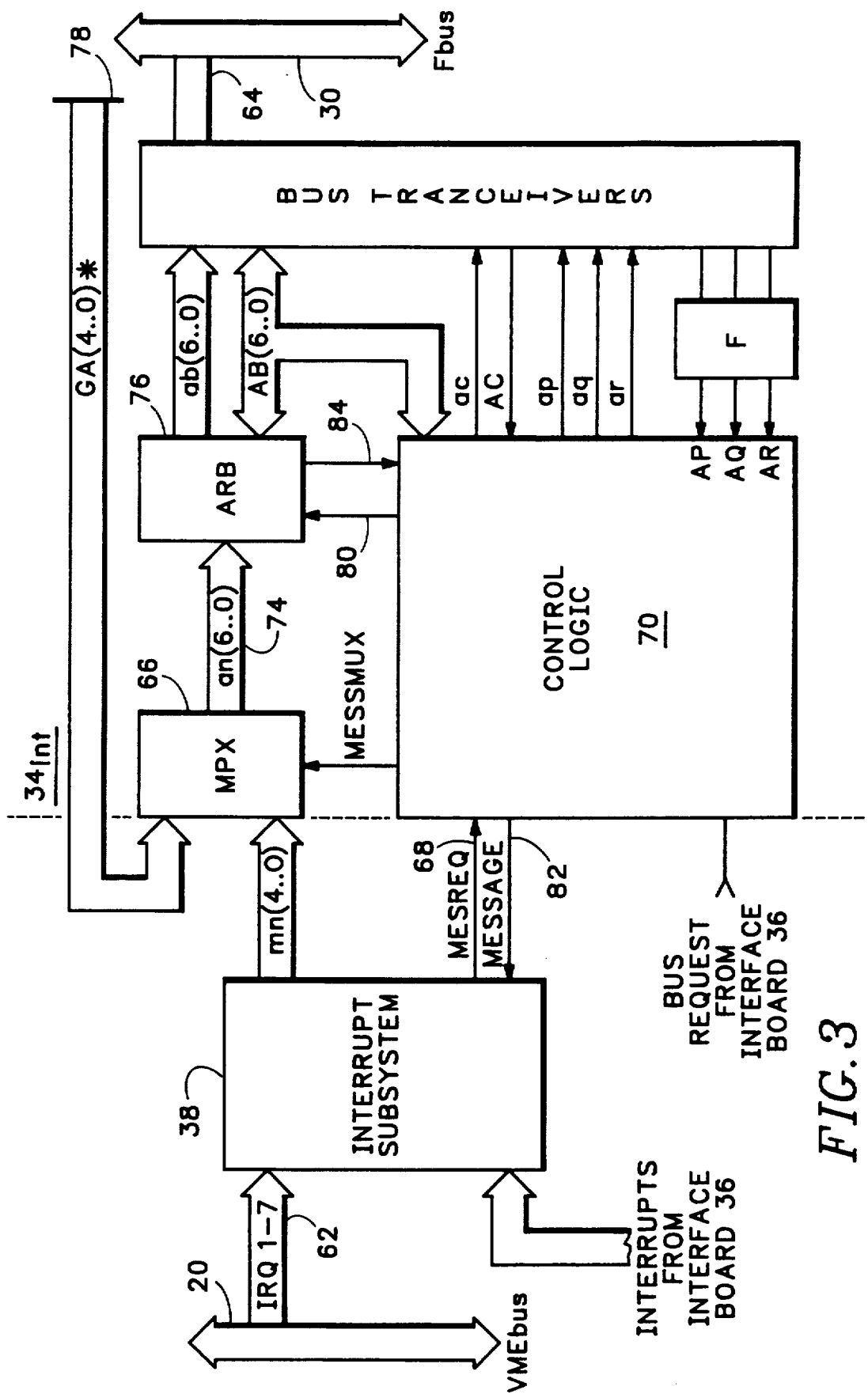
FIG. 3 is a schematic block diagram of the interrupt subsystem of FIG. 1.

Referring to FIG. 3 in conjunction with FIG. 1, the interrupt subsystem 38 of FIG. 1 is shown in greater detail. Hardware interrupts are sent across the Futurebus 28 by using an arbitration emergency message facility of the Futurebus protocol. The bus arbitration circuit $34_{int}$ of the interface board 36 runs in parallel with and services a data transfer bus $60_v$, $60_f$ controlled by the interface board; therefore, interrupt messages can be received from either the interface board or the VMEbus by way of bus 62, and sent to the Futurebus via bus 64, while registers in the interrupt subsystem 38 are being accessed by software through the interface board 36.

The interrupt subsystem 38 receives hardware interrupt signals IRQ1..7 from the VMEbus priority interrupt bus 20 via the bus 62, and from the interface board 36, the latter relating to data transfer operations between the VMEbus and the Futurebus. The interrupt subsystem 38 groups the plurality of interrupt sources, nineteen in the presently described embodiment of the invention, into interrupt classes, each class having a corresponding message number of predetermined priority. Message number signals mn<4..0> are applied from the interrupt subsystem 38 to a message multiplexer 66, which corresponds to the arbitration number selector 48 of FIG. 2. Although multiple interrupts from different sources can be asserted in one class, only one message corresponding with the class of interrupts is sent by the interrupt subsystem 38 to the Futurebus.

The bus arbitration unit 34, in addition to being used for contention resolution among the devices on the Futurebus, can also be used, through the interface board arbitration unit $34_{int}$, to signal events across the bus 30. In order to transmit interrupts across the Futurebus, the interrupt sources from the VMEbus 20 and also those generated on the interface board 36 are mapped and converted into message numbers higher than the arbitration numbers utilized by devices on the arbitration bus 30 contending for use of the data/address bus 29. The interrupt subsystem 38, when there is a need to signal the Futurebus that an event-driven signal or interrupt has occurred, initiates a bus arbitration cycle by asserting a message request signal MESREQ on line 68; the MESREQ signal corresponds with the BUS REQUEST signal generated by a PM module. Control logic 70, which corresponds with generic control logic 50 of FIG. 2, generates a signal MESSMUX on line 72 to the multiplexer 66. Responsive to the MESSMUX signal, the multiplexer 66 asserts the mn<4..0> signals on bus 74 to arbitration logic 76, while inhibiting the GA<4..0> signals from bus connector 78 of the Futurebus backpanel. The arbitration logic 76 thus receives on the an<6..0> lines 74 an interrupt message number from the interrupt subsystem 38 instead of the arbitration number assigned to the interface board 36.

The control logic 70 asserts the COMPETE signal on line 80 to the arbitration logic 76 to begin the bus arbitration process as previously described under "Control Synchronization," and generates an acknowledgment signal, MESSAGE, on line 82 to notify the interrupt subsystem 38 that an interrupt message is being sent to the Futurebus interface. The interrupt subsystem 38 wins the arbitration unless another interrupt subsystem on the arbitration bus 30 should assert a higher priority message number, and all devices on the Futurebus receive the interrupt message, which appears as an arbitration number AB<6..0>* on the bus 30. The arbitration logic 76 asserts a signal WINNER on line 84 to the control logic 70 (which corresponds with the WIN/LOSE signal of FIG. 2), but instead of acquiring the bus after winning the arbitration, the interrupt subsystem 38 releases the bus, as previously described with reference to operations 4 and 5.

Figure 4:
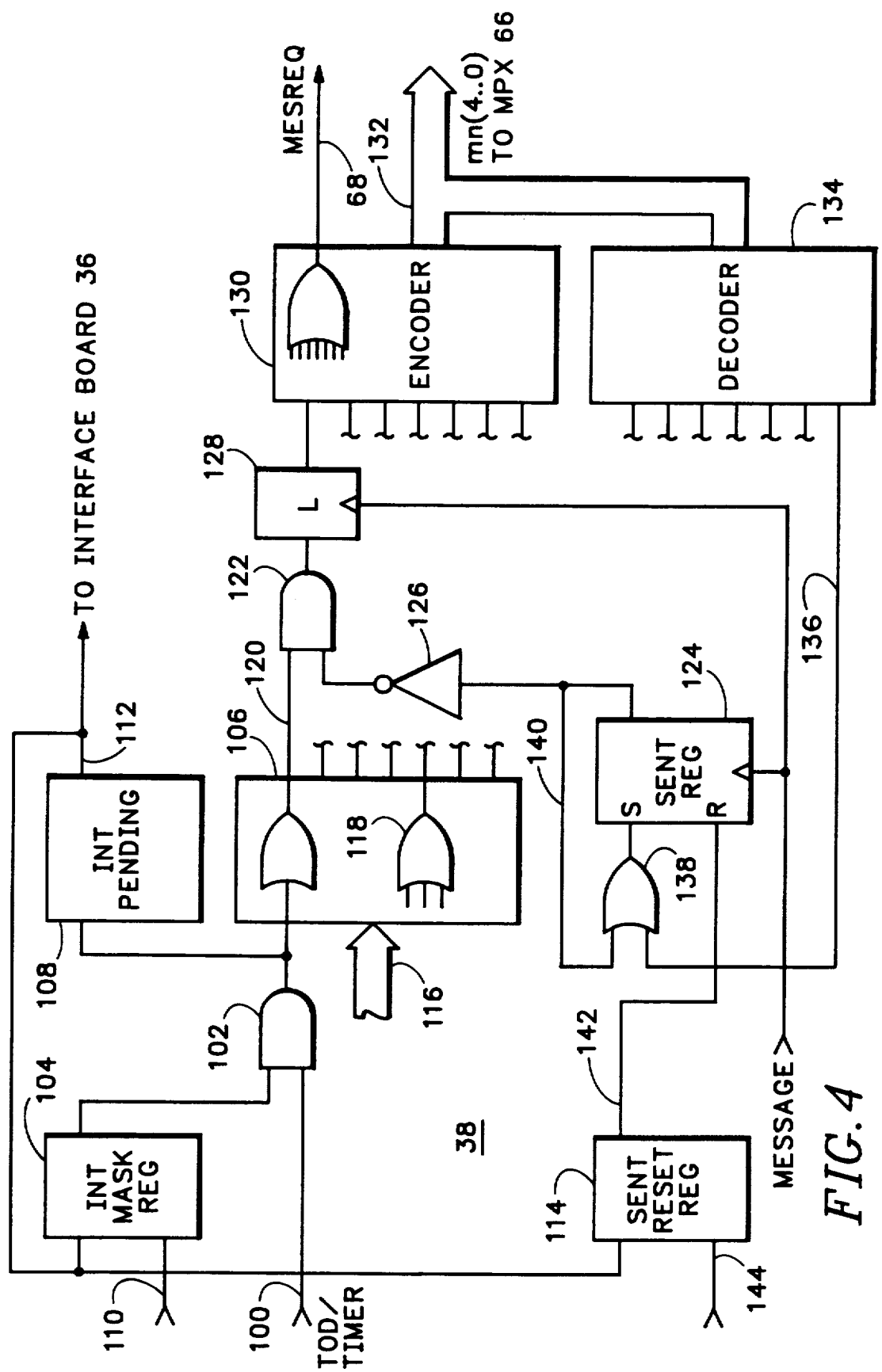
FIG. 4 is a schematic diagram of the interrupt subsystem circuits of FIG. 3.

Referring to FIG. 4 in conjunction with FIGS. 1 and 3, the interrupt subsystem logic 38 of FIG. 3 is shown in greater detail. FIG. 4 depicts logic circuits associated with one representative interrupt signal, TOD/TIMER. The ensuing description, although referring generally to registers, describes what appears in FIG. 4 as single bistable elements of such registers; it is understood that logic for multiple interrupt signals may be implemented in multibit registers by replicating the logic circuits depicted in FIG. 4.

The TOD/TIMER interrupt signal is input to an AND gate 102 with an appropriate bit output from an interrupt mask register 104. The interrupt signal 100, if enabled by the mask register 104, is applied to priority grouping logic 106 and to an interrupt pending status register 108. Interrupt registers such as the registers 104, 108 serve as hardware interface elements communicating with system software routines that service hardware interrupts in accordance with techniques well known in the art. The mask register 104 is software accessible and receives input signals via bus 110 from the interface board 36, which input signals enable selected interrupt signals from AND gates such as the AND gate 102. An output signal of the interrupt pending status register 108 is provided to the interface board 36, fed back to an input of the interrupt mask register 104 to reset the mask register bit enabling AND gate 102, and applied to one input of a sent reset register 114.

The priority grouping logic 106 comprises an OR gate structure that receives the TOD/TIMER interrupt signal and signals from other interrupt sources on input lines 116, combining the plurality of interrupt sources into logical groupings. For example, all interrupts relating to bus parity errors could be combined to produce a single output signal as illustrated by the representative OR gate 118. Alternatively, a single input signal such as the TOD/TIMER signal can generate an output. A signal bit representing a request for transmission of a particular interrupt message, in the presently described example the TOD/TIMER interrupt, emanates from the priority grouping logic 106 on lead 120 and is applied to one input of AND gate 122. The output of a sent register 124, which is disabled, is applied through inverter 126 to a second input of AND gate 122 enabling the output thereof through a transparent latch circuit 128 to an input of a priority encoder circuit 130. The priority encoder circuit 130 receives a plurality of interrupt bits and generates the interrupt message number mn<4..0> corresponding with the enabled input bit having the highest predetermined priority. The message number mn<4..0> is applied by way of bus 132 to the multiplexer 66, and concurrently with generation of the message number mn<4..0>, the interrupt bits applied to the priority encoder circuit are ORed to generate the MESREQ message request signal on line 68 to the arbitration bus control logic 70. The message number mn<4..0> is applied to a decoder circuit 134, which converts the message number to a sent register latch bit on a line 136 corresponding with the interrupt signal bit which enabled the message number in the priority encoder 130. The sent register latch bit 136 enables the sent register 124 through OR gate 138; the enabled output of the sent register latches the register via line 140 through the OR gate 138, and disables AND gate 122, which prevents the current interrupt from being reasserted. However, to retain the interrupt message on the bus 132, the leading edge of the MESSAGE signal on line 82 from the arbitration controller, which indicates that an interrupt message is being sent across the bus (bus contention is in progress), latches the interrupt bit into the latch circuit 128. When the MESSAGE signal is disabled, indicating that the interrupt message has been sent successfully across the bus 30, the falling edge of the MESSAGE signal resets the sent register 124 and disables the latch circuit 128. The sent register 124 is reset by a signal on line 142 from the sent reset register 114, thereby conditioning the AND gate 122 for generating another interrupt signal. The sent reset register is software accessible via enabling input 144 to acknowledge servicing of the interrupt message sent.

While the principles of the invention have now been made clear in the foregoing illustrative embodiment, there will be immediately obvious to those skilled in the art many modifications of structure, arrangement, proportions, the elements, material and components used in the practice of the invention, and otherwise, which are particularly adapted for specific environments and operating requirements without departing from those principles. The appended claims are, therefore, intended to cover and embrace any such modifications, within the limits only of the true spirit and scope of the invention.

I claim:

1. In a data processing system having a plurality of modular devices each connected asynchronously to a standard backplane bus and including a distributed-logic arbitration controller resolving contention for access to the standard backplane bus among the plurality of modular devices and communicating with each of the plurality of modular devices for the purpose of arbitration by way of an arbitration bus of the standard backplane bus, wherein each of the plurality of modular devices contending for access to the bus during an arbitration cycle asserts a unique arbitration number on the arbitration bus, the arbitration controller granting control of the standard backplane bus to one of the contending modular devices in accordance with a predetermined order of priority of the arbitration numbers of the plurality of modular devices, the arbitration controller, prior to granting such control to the one contending modular device, releasing from the arbitration bus the arbitration numbers of other contending modular devices, the arbitration number of the one contending modular device remaining asserted on the arbitration bus for recording by the plurality of modular devices, at least one of the modular devices having an event-driven interrupt signal source, the improvement comprising a method of transmitting an event-driven interrupt signal from one of the plurality of modular devices to all of the other modular devices across the standard backplane bus, the method comprising the steps of:

converting in the at-least-one of the modular devices the event-driven interrupt signal to an interrupt message number having a priority higher than the arbitration numbers of the plurality of modular devices;

initiating an arbitration cycle from the at-least-one of the modular devices;

asserting the interrupt message number on the arbitration bus during a bus arbitration cycle; and relinquishing control of the standard backplane bus after such control is granted to the at-least-one of the modular devices by the arbitration controller, the interrupt message having been recorded by the plurality of modular devices.

2. In an interface circuit module transferring data between first and second data processing systems and connected between a first backplane bus of the first data processing system and a second backplane bus of the second data processing system, the first backplane bus including a priority interrupt bus and a data transfer bus communicating with the interface circuit module, the second backplane bus including an arbitration bus and an address/data bus communicating with the interface module, the second data processing system including a plurality of modular devices connected to the second backplane bus and contending for access to the second backplane bus by way of the arbitration bus during an arbitration cycle, each of the plurality of devices having a unique arbitration number of predetermined priority by which access to the backplane bus is asserted and granted during the bus arbitration cycle, each of the plurality of devices including means for registering the arbitration number of a device granted bus access during the arbitration cycle, apparatus for transmitting a priority interrupt signal from the priority interrupt bus to devices connected to the second backplane bus, the apparatus comprising:

means in the interface circuit module for receiving the interrupt signal;

means coupled to the receiving means for generating an interrupt message having a higher priority than the unique arbitration numbers; and means for asserting the interrupt message on the arbitration bus as an arbitration number during an arbitration cycle, thereby transmitting the interrupt message to the plurality of devices across the second backplane bus.

3. The apparatus according to claim 2 further comprising means in the interface circuit module for releasing control of the second backplane bus during the arbitration cycle after the plurality of devices connected to the second backplane bus have registered the interrupt message.

* * * * *